United States Patent [19]

Maruyama

[11] Patent Number: 4,966,449
[45] Date of Patent: Oct. 30, 1990

[54] TELEPHOTO LENS SYSTEM
[75] Inventor: Koichi Maruyama, Tokyo, Japan
[73] Assignee: Asahi Kogaku Kogyo Kabushiki Kaisha, Tokyo, Japan
[21] Appl. No.: 384,619
[22] Filed: Jul. 25, 1989
[30] Foreign Application Priority Data Jul. 30, 1988 [JP] Japan ................................ 63-191161

[51] Int. Cl.$^5$ ............................................. G02B 13/02
[52] U.S. Cl. .................................................... 0350/454
[58] Field of Search ......................................... 350/454

[56] References Cited

U.S. PATENT DOCUMENTS 4,812,026  3/1989  Iima ..................................... 350/454

FOREIGN PATENT DOCUMENTS 59-170811  9/1984  Japan .
59-214008  12/1984  Japan .

Primary Examiner—Bruce Y. Arnold
Assistant Examiner—Rebecca D. Gass
Attorney, Agent, or Firm—Sughrue, Mion, Zinn, Macpeak & Seas

[57] ABSTRACT

A telephoto lens system utilizing an inner focusing method, for use in a 35-mm single-lens reflex camera, and despite its lightweight, compact size ensures high performance, and which performs focusing by moving only one lens unit. Performance of the telephoto lens system includes: having a telephoto ratio of no more than 0.7, yet compensating for aberrations when focused upon an object at infinity; adopting an inner focusing method, yet being capable of focusing at the closest distance which is no greater than 7 times the focal length for infinity; and performing near focusing without causing great aberrational variations. The telephoto lens system, in order from the object side, includes: a first lens unit having a positive refractive power; a second lens unit having a weak refractive power; and a third lens unit having a negative refractive power, and which performs focusing for an object at a finite distance by movement of the third lens unit.

11 Claims, 8 Drawing Sheets

TELEPHOTO LENS SYSTEM

BACKGROUND OF THE INVENTION

The present invention relates to a telephoto lens system, and, more particularly, to a telephoto lens system for use in a 35-mm single-lens reflex camera that insures high performance despite its compact size, and which performs focusing by moving only one lens unit in the system.

With the advent of cameras containing automatic focusing mechanisms, the advantages of inner focusing telephoto lenses increasingly has been recognized. A major requirement for lenses adapted for automatic focusing is that the movable lens units be sufficiently lightweight to achieve focusing without burdening the lens drive source. In particular, regarding telephoto lenses which theoretically cannot be manufactured without increasing the optical system size, an inner focusing feature has become essential to achieve automatic focusing.

Accordingly, various designs of inner focusing telephoto lens systems have been developed to take advantage of their features of "light" focusing, small centroid movement, and stability during focusing. Some of the designs proposed to date are described in JP-A-59-214008 (the term "JP-A" as used hereunder means an "unexamined published Japanese patent application"), JP-A-59-170811, and Japanese Patent Application No. 62-26787 which was filed previously by the common assignee.

Despite the advantages described above, inner focusing lens systems generally have several problems. For example, in order for focusing units to move within the optical system, often the overall lens system size must be increased. If the refractive power of the focusing groups is increased to reduce the amount of their movement, great aberrational changes will result during focusing at near distance. Accordingly, designing a compact inner focusing telephoto lens system has been difficult, as compared with designs that perform focusing by advancing not only the front lens, but also the overall system. The system described in JP-A-59-214008 features a telephoto ratio of about 0.8, and the closest focusing distance is 7.5f (where f is the overall focal length) when inner focusing is adopted.

In contrast, JP-A-59-170811 and Japanese Patent Application No. 62-26787 propose compact systems that have comparatively large values of $F_{NO}$ and small telephoto ratios. However, they suffer from the closest focusing distance being long, great aberrational variations occurring when focusing, and the powers of individual lenses being so strong that the system performance varies due to lens manufacturing inconsistencies.

The telephoto lens system described in JP-A-59-170811 has a telephoto ratio of 0.71 and a closest focusing distance of 10f. A negative meniscus lens is positioned just behind the first lens group and by making it partly responsible for compensation for spherical aberration, the burden on the focusing lens units of compensating for spherical aberration is reduced sufficiently to ensure efficient compensation for aberrational changes that will occur during focusing. However, if further reduction of the overall size of the system by this method is attempted so that spherical aberration can be compensated for satisfactorily by the meniscus lens, the Petzval sum oftentimes will assume a negative value to cause either curvature of the field, or astigmatism. In other words, the telephoto ratio of the system proposed in JP-A-59-170811 cannot be made smaller without causing residual astigmatism, or insufficient compensation for the variations in spherical aberration.

The telephoto lens system described in Japanese Patent Application No. 62-26787 has a telephoto ratio of 0.68 and a closest focusing distance of 7f. The second lens group in this system is a positive lens unit, whereas the third lens unit is composed of a cemented negative lens unit and a positive lens. The advantages, if any, of employing the positive second lens unit are not clear since they are not stated expressly in the specification. Regarding the composition of the third lens unit, if the positive first unit (III-1) in the third lens unit is cemented to the negative second unit (III-2), the refractive index of the positive first unit must be increased and negative spherical aberration must be developed at the cemented surface in order to compensate for the spherical aberration that might occur in the third lens unit. In other words, the Petzval sum is reduced to the negative side by this arrangement, thus being liable to the development of field curvature. In order to solve this problem, Japanese Patent Application No. 62-26787 makes the following proposal: in order to compensate for the negative Petzval effect of the third lens unit, the individual lens surfaces of the first lens unit are designed to have a very strong power so that the Petzval sum is shifted to the positive side to ensure that aberrations are compensated for effectively. However, from a manufacturing viewpoint, lens systems that adopt the method of aberrational compensation described above are very difficult to fabricate because the absolute values of the third-order aberration coefficient, which measures the effect that might be caused on the surface precision aberration, are particularly great at the first, fifth, sixth, seventh and tenth surfaces. This will inevitably lead to variations in lens performance due to non-uniformity in the machining precision.

SUMMARY OF THE INVENTION

The present invention solves these problems of the prior art, and its principal object is to provide an improved telephoto lens system having the following features: it is a very compact system with a telephoto ratio of no more than 0.7 (0.62–0.65 in the examples to be given hereinafter), and yet achieves effective compensation for aberrations when focused upon an object at infinity; it adopts an inner focusing method, and yet, is capable of focusing at the closest distance which is no greater than 7 times the focal length for infinity; the focusing at near distance can be effected without causing great aberrational variations; and it is resistant to variations in performance even if the machining precision during lens manufacturing is nonuniform.

Generally, the above-stated object of the present invention can be attained by a telephoto lens system which, in order from the object side, includes: a first lens unit having a positive refractive power; a second lens unit having a weak refractive power; and a third lens unit having a negative refractive power, and which performs focusing for an object at a finite distance by movement of the third lens unit. More specifically, the first lens unit is composed of a positive first lens (I-1), a positive second lens (I-2), a negative third lens (I-3), and a positive fourth lens (I-4). The second lens unit is composed of a cemented lens having a positive first lens (II-1) cemented to a negative second lens (II-2). The third lens unit includes at least one negative lens element, and at least one positive lens element. The system satisfies conditions (1)-(7) below:

$$0.26 < f_{I\text{-}1,2}/f < 0.34 \tag{1}$$

$$0.40 < f_1/f < 0.58 \tag{2}$$

$$35 < \nu_{IP}\text{-}\nu_{IN} \tag{3}$$

$$-2.8 < \frac{f(n_{II\text{-}2} - n_{II\text{-}1})}{r_{II\text{-}2}} < -1.6 \tag{4}$$

$$0.16 < n_{II\text{-}2}\text{-}n_{II\text{-}1} \tag{5}$$

$$0.075 < n_{III\,N}\text{-}n_{III\,P} \tag{6}$$

$$-1.00 < f/f_{II} < 0.04 \tag{7}$$

where f: the focal length of the overall system
$f_{I\text{-}1,2}$: the composite focal length from lens I-1 to lens I-2
$f_I$: the composite focal length of the first lens unit
$\nu_{IP}$: the average of the Abbe numbers of positive lenses in the first lens unit
$\mu_{IN}$: the average of the Abbe numbers of negative lenses in the first lens unit
$r_{II\text{-}2}$: the radius of curvature of the cemented surface of the second lens unit
$n_{i\text{-}j}$: the refractive index at the d-line of the j-th lens in the i-th lens unit as counted from the object side
$n_{IIIN}$: the average of the refractive indices at the d-line of negative lenses in the third lens unit
$n_{IIIP}$: the average of the refractive indices at the d-line of positive lenses in the third lens unit
$f_{II}$: the composite focal length of the second lens unit.

To reduce the number of constituent lens elements, the third lens unit preferably is composed in one of the ways, (A)–(D), described below:

(A) The third lens unit is composed of a positive first lens (III-1) having a strong convex surface on the image side, a negative second lens (III-2), and a positive meniscus third lens (III-3) having a convex surface directed toward the object, with the following three conditions (8) (10) additionally being satisfied:

$$0.090 < n_{III\,N}\text{-}n_{III\,P} \tag{8}$$

$$0.0 < d_{III\text{-}1,2}/f < 0.02 \tag{9}$$

$$0.04 < d_{III\text{-}2,3}/f < 0.11 \tag{10}$$

| where $d_{III\text{-}1,2}$: | the distance between first lens III-1 the second lens III-2 |
|---|---|
| $d_{III\text{-}2,3}$: | the distance between second lens III-2 and third lens III-3. |

(B) The third lens unit is composed of a negative meniscus first lens (III-1), a positive meniscus second lens (III-2), and a positive meniscus third lens (III-3), each having a convex surface directed toward the object, with the three conditions, (11)–(13), defined below additionally being satisfied:

$$0.075 < n_{III\,N}\text{-}n_{III\,P} \tag{11}$$

$$0.0 < d_{III\text{-}1,2}/f < 0.02 \tag{12}$$

$$0.04 < d_{III\text{-}2,3}/f < 0.11 \tag{13}.$$

(C) The third lens unit is composed of a negative meniscus first lens (III-1) having a convex surface directed toward the object, a negative second lens (III-2), and a positive third lens (III-3), with the three conditions (14)–(16) described below additionally being satisfied:

$$0.075 < n_{III\,N}\text{-}n_{III\,P} \tag{14}$$

$$0.02 < d_{III\text{-}1,2}/f < 0.08 \tag{15}$$

$$0.00 < d_{III\text{-}2,3}/f < 0.04 \tag{16}.$$

(D) The third lens unit is composed of a negative meniscus first lens (III-1) having a convex surface directed toward the object, a positive second lens (III-2), and a negative third lens (III-3), with the three conditions (17)–(19), defined below additionally being satisfied:

$$0.075 < n_{III\,N}\text{-}n_{III\,P} \tag{17}$$

$$0.02 < d_{III\text{-}1,2}/f < 0.11 \tag{18}$$

$$0.00 < d_{III\text{-}2,3}/f < 0.04 \tag{19}.$$

In order to attain a particularly small telephoto ratio, the following three additional conditions, (20) through (22) preferably are satisfied:

$$0.07 < d_{I\text{-}2,3}/f < 0.10 \tag{20}$$

$$0.40 < f_{I,II}/f < 0.58 \tag{21}$$

$$0.26 < L/f < 0.40 \tag{22}$$

where $d_{I\text{-}2,3}$: the distance between lens I-2 and lens I-3
$f_{I,ii}$: the composite focal length from the first lens unit to the second lens unit
L: the distance from the second principal point of the first lens unit to the cemented surface of the second lens unit.

Secondary spectra can be reduced to low levels if all the positive lens in the first and second lens units satisfy condition (23) shown below, and if all the negative lenses in the first and second lens units satisfy condition (24) below:

$$\theta_{ij} < -0.0018\nu_{ij} + 0.653 \tag{23}$$

$$\theta_{ij} < -0.0018\nu_{ij} + 0.649 \tag{24}$$

where $\theta_{ij}$: the partial dispersion ratio of the j-th lens in the i-th lens unit as counted from the object side $$\left(\theta = \frac{n_g - n_F}{n_F - n_c}\right)$$

$\nu_{ij}$: the Abbe number of the j-th lens in the i-th lens unit as counted from the object side.

DETAILED DESCRIPTION OF THE PREFERRED EMBODIMENTS

Figure 1:
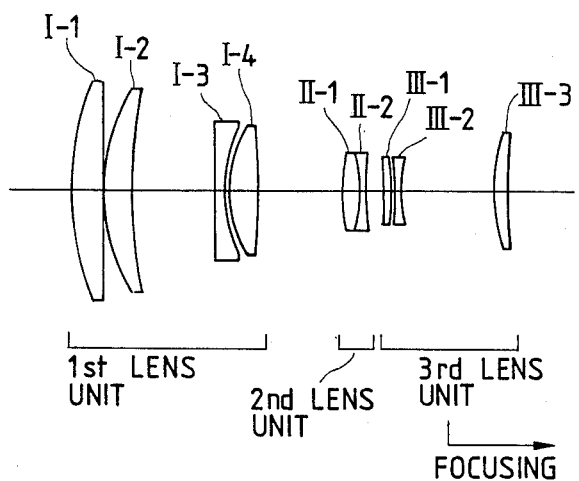
FIG. 1 shows a simplified cross-sectional view of the telephoto lens system constructed in Example 1, with the individual lens components being identified by their names.
Figure 2:
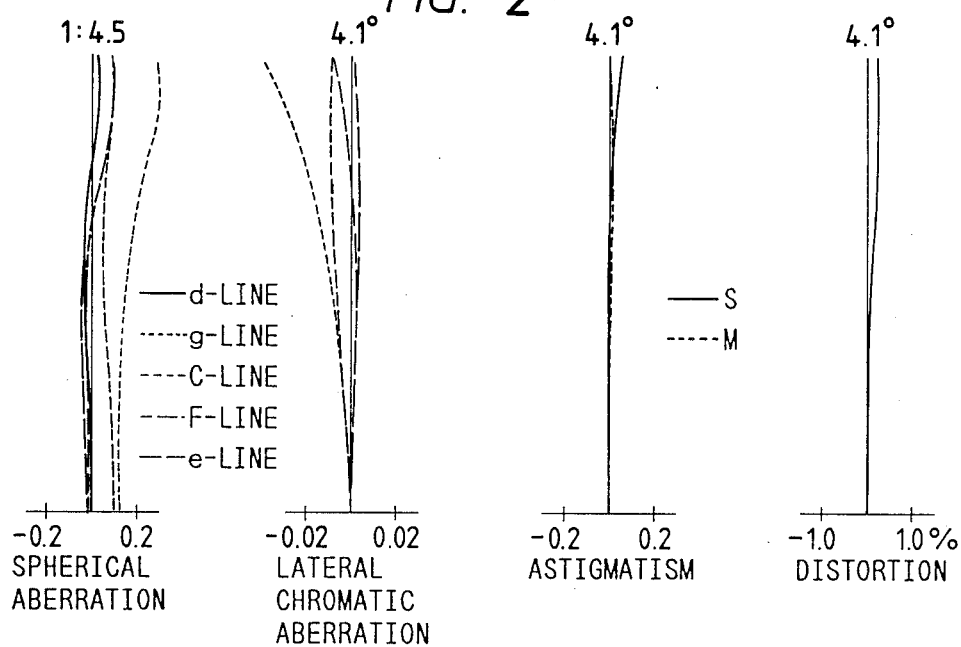
FIG. 2 is a graph plotting the aberration curves obtained with the lens system of Example 1 when it is focused at infinity.
Figure 3:
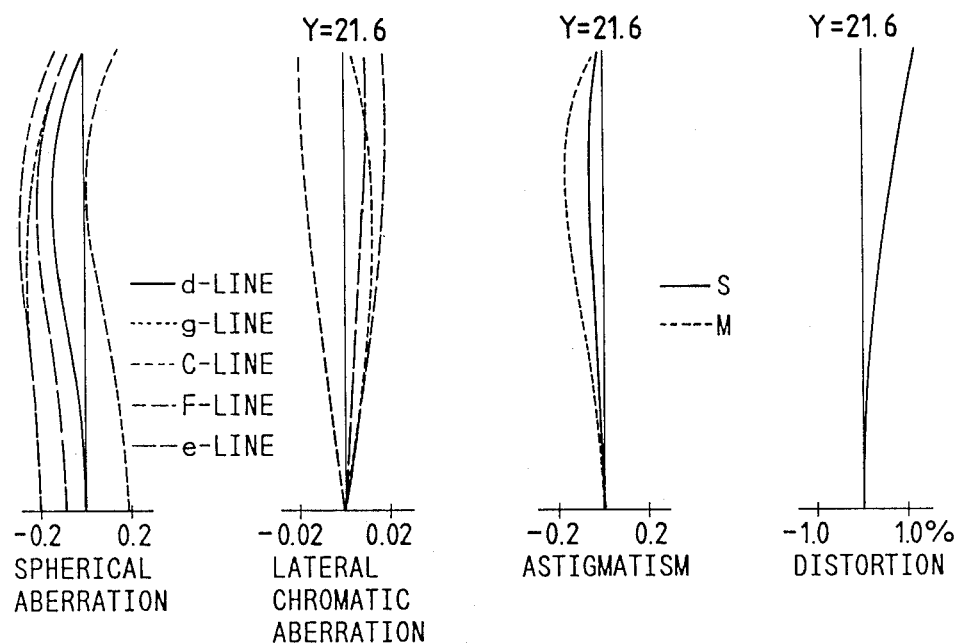
FIG. 3 is a graph plotting the aberration curves obtained with the lens system of Example 1 when it is focused at the closest distance.
Figure 4:
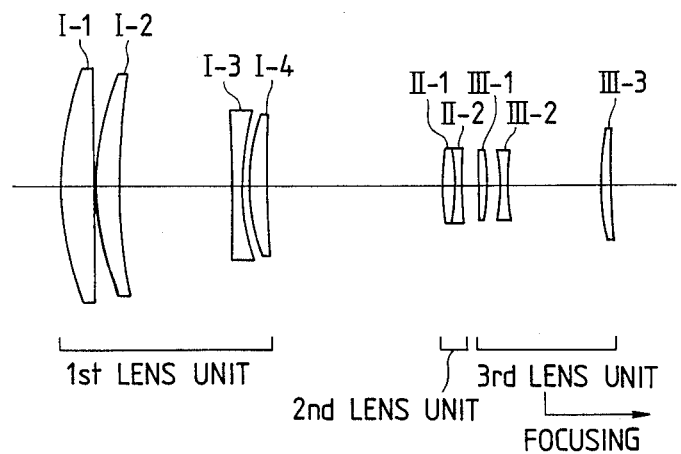
FIG. 4 shows a simplified cross-sectional view of the telephoto lens system constructed in Example 2.
Figure 5:
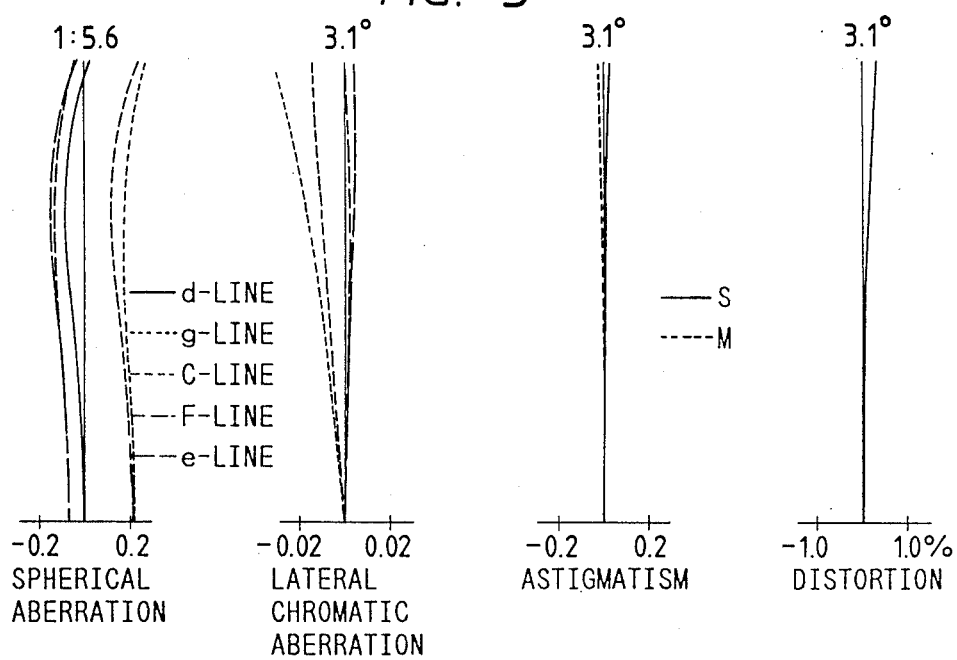
FIG. 5 is a graph plotting the aberration curves obtained with the lens system of Example 2 when it is focused at infinity.
Figure 6:
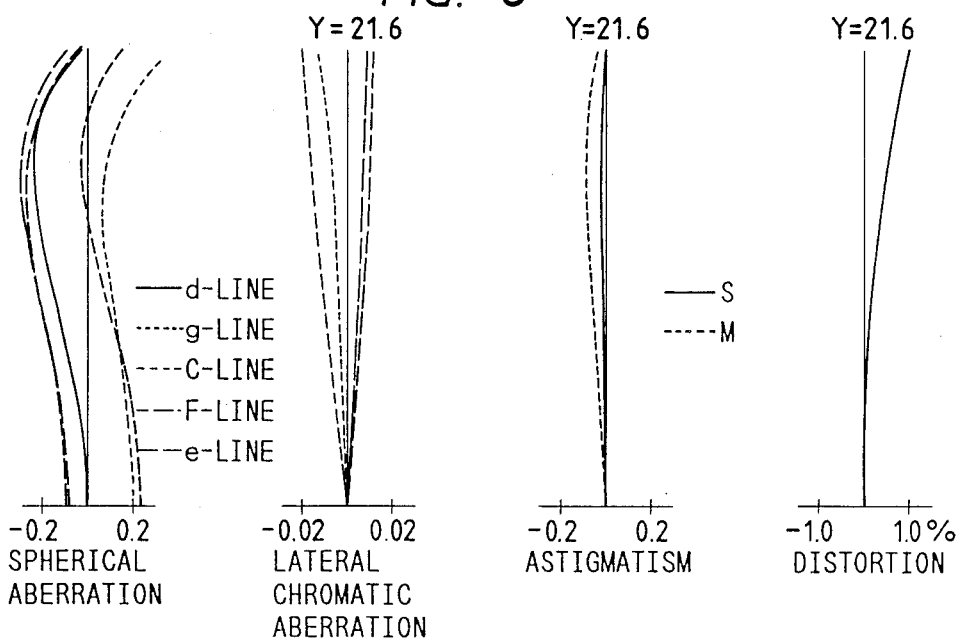
FIG. 6 is a graph plotting the aberration curves obtained with the lens system of Example 2 when it is focused at the closest distance.
Figure 7:
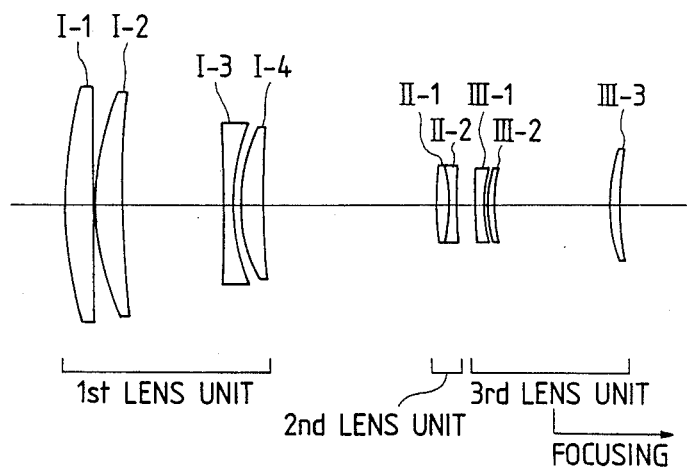
FIG. 7 shows a simplified cross-sectional view of the telephoto lens system constructed in Example 3.
Figure 8:
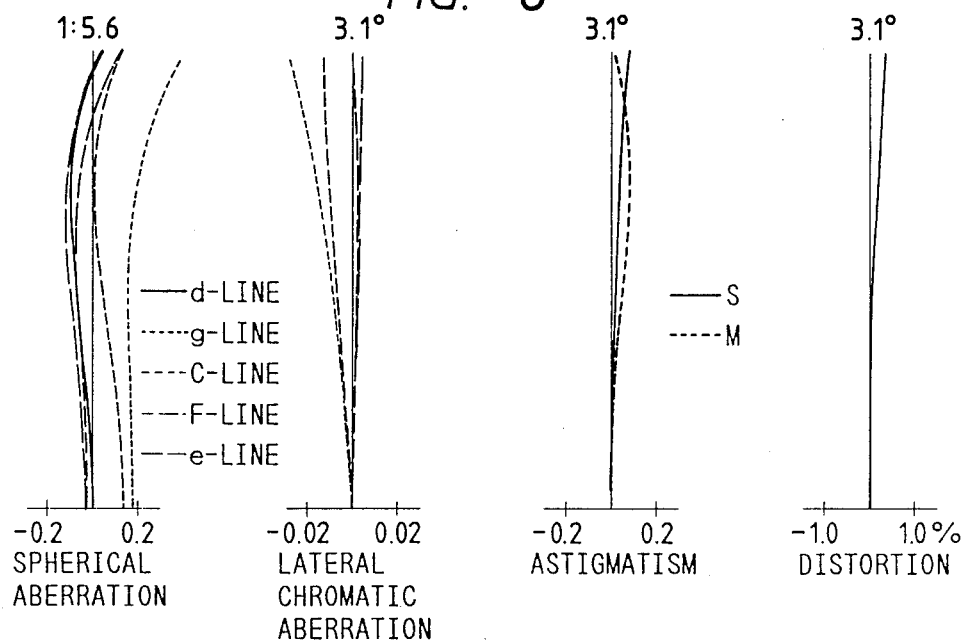
FIG. 8 is a graph plotting the aberration curves obtained with the lens system of Example 3 when it is focused at infinity.
Figure 9:
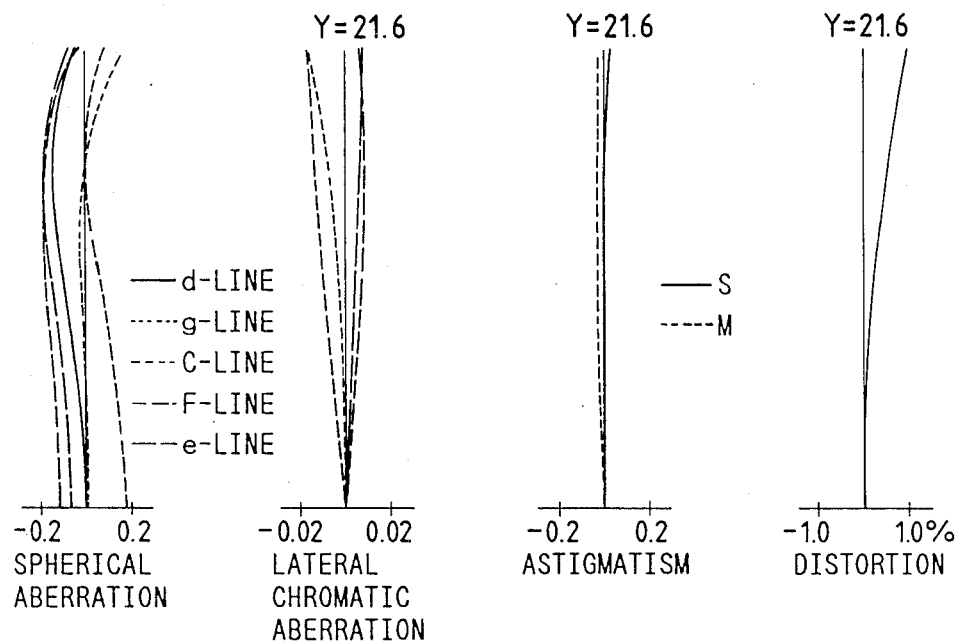
FIG. 9 is a graph plotting the aberration curves obtained with the lens system of Example 3 when it is focused at the closest distance.
Figure 10:
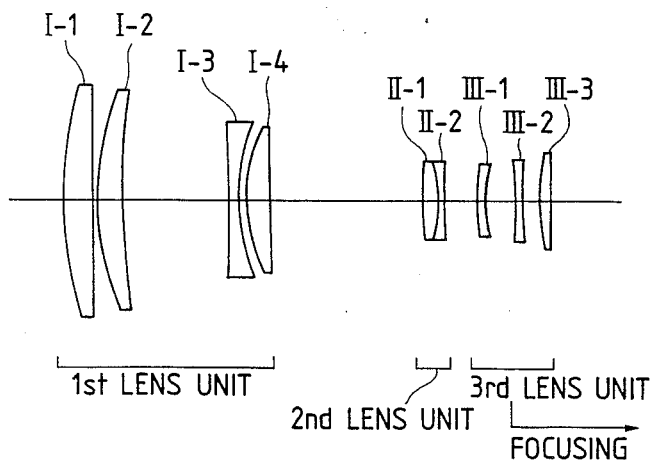
FIG. 10 shows a simplified cross-sectional view of the telephoto lens system constructed in Example 4.
Figure 11:
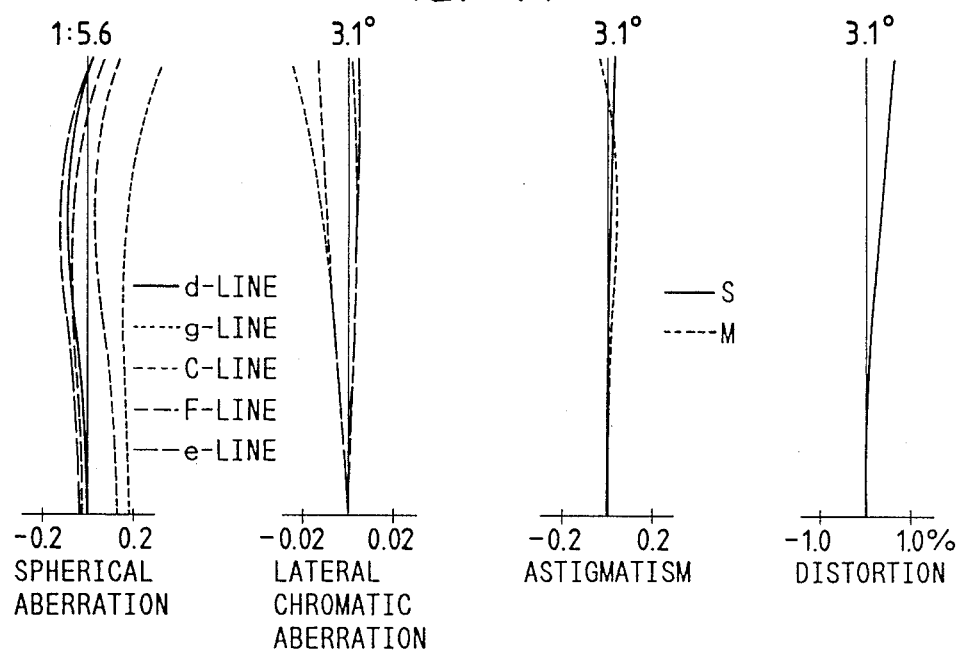
FIG. 11 is a graph plotting the aberration curves obtained with the lens system of Example 4 when it is focused at infinity.
Figure 12:
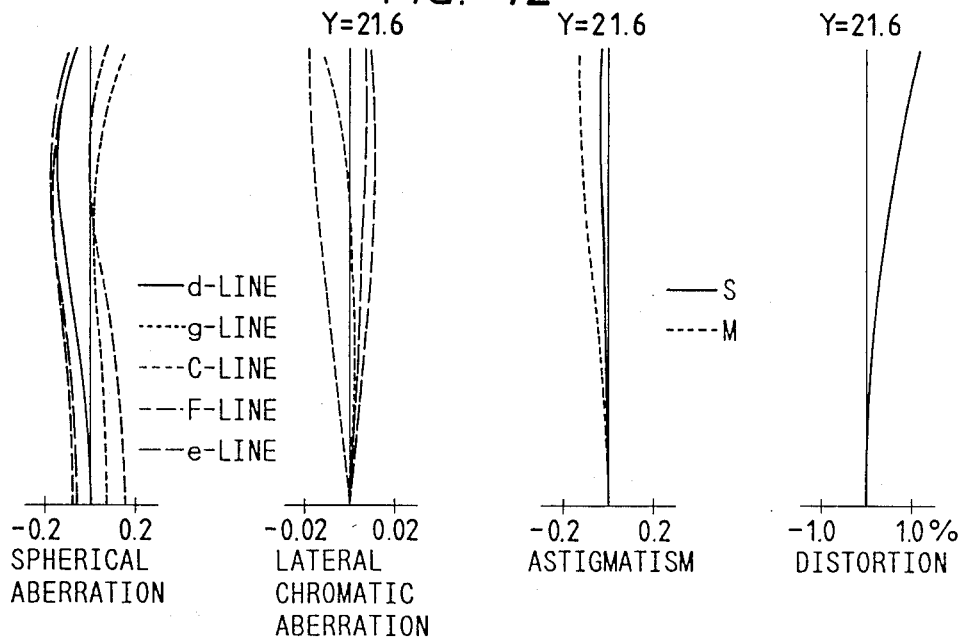
FIG. 12 is a graph plotting the aberration curves obtained with the lens system of Example 4 when it is focused at the closest distance.
Figure 13:
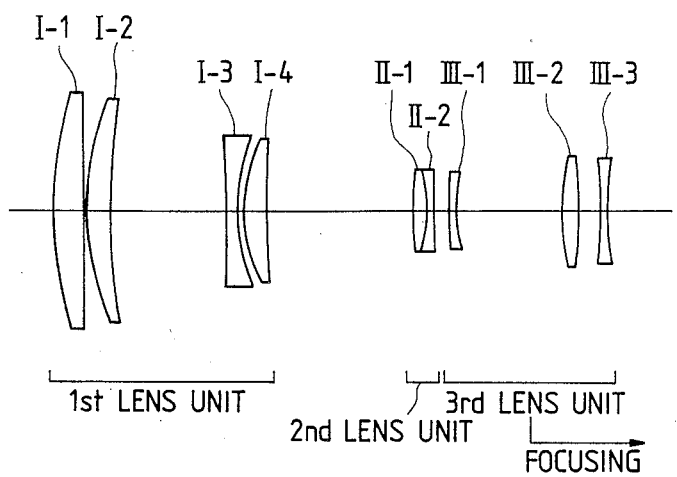
FIG. 13 is a diagram showing a simplified cross-sectional view of the telephoto lens system constructed in Example 5.
Figure 14:
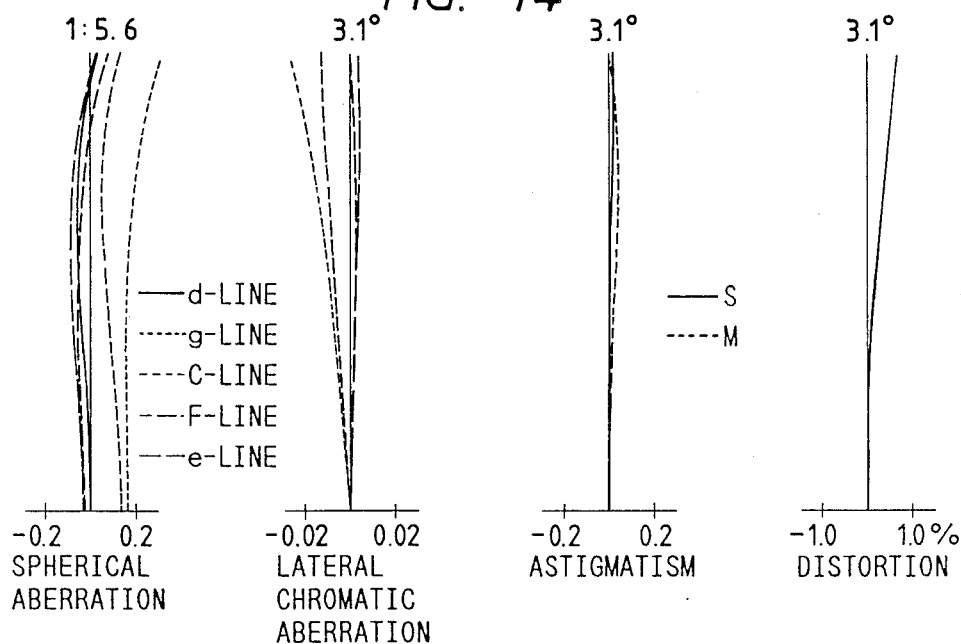
FIG. 14 is a graph plotting the aberration curves obtained with the lens system of Example 5 when it is focused at infinity.
Figure 15:
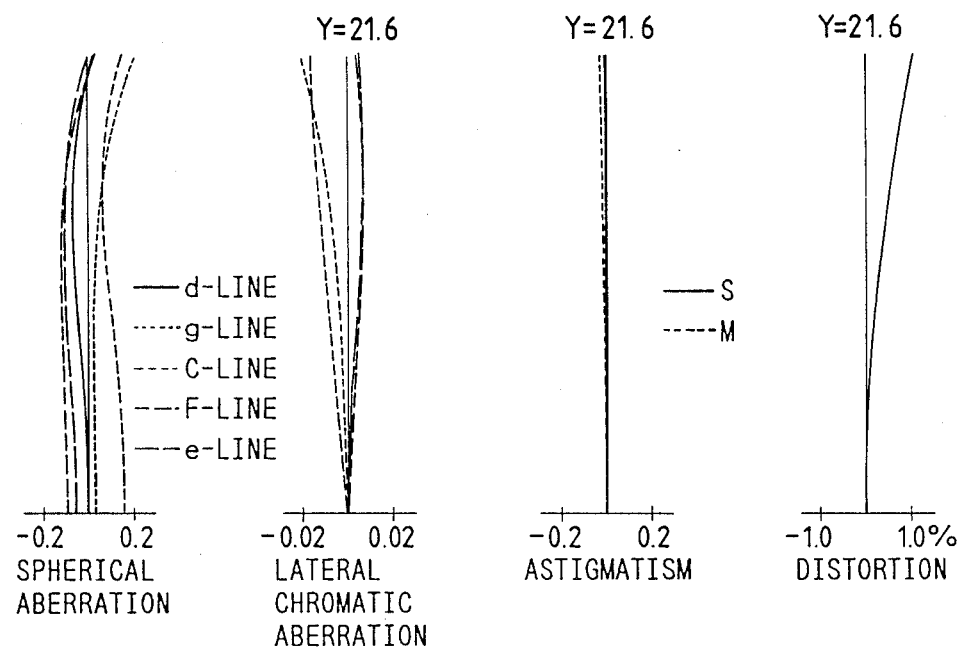
FIG. 15 is a graph plotting the aberration curves obtained with the lens system of Example 5 when it is focused at the closest distance.

The lens arrangements and the various conditions to be satisfied by the telephoto lens system of the present invention are described in detail below. The first lens unit is designed to have an overall positive power in order to reduce its telephoto ratio. It uses three positive lens elements among which the refractive power is distributed in order to ensure that individual lens surfaces can be machined with low tolerances. Additionally, the first lens unit uses a single negative lens element to satisfy the need for color correction in that unit. To reduce telephoto ratio and the weight of the first lens unit, the negative lens element preferably is positioned close to the image. However, if the fourth lens (I-4) in the first lens unit is a negative lens, incident light will fall on the lens (I-4) at such an acute angle that unusually great aberrations of higher orders will develop. To avoid this problem, the third lens (I-3), rather than the fourth lens (I-4), is designed as a negative lens.

The second lens unit has a divergent surface that effectively reduces the undercompensation for spherical aberrations that would occur if focusing at near distance. This undercompensation for spherical aberrations is performed by increasing the distance between the front positive lens unit and the rear negative lens unit according to the method described in JP-A-59-214008. In JP-A-59-214008, no mention is made of the power of the second lens unit. As for the second lens unit in the system of the present invention, this unit should have substantially no power in order to meet the two requirements of: (1) the divergent surface be positioned remotely from the first lens unit to have a sufficient capability for compensating for variations in spherical aberration; and (2) the overall lens system be compact, but not so small as to eliminate the space for movement of the third lens unit.

The third lens unit is a focusing lens unit which is composed of a negative lens unit chiefly responsible for the focusing action, and a positive lens unit chiefly responsible for the compensation for distortion and field curvature.

Conditions (1) and (2) should be satisfied to realize a compact, and yet, high-performance lens system. If the lower limit of condition (1) is not reached, it is difficult to compensate completely for the chromatic aberration that develops in lenses I-1 and I-2, and lateral chromatic aberration will remain. If the lower limit of condition (2) is not reached, a strong negative power for the rear unit is required, and this compensates for field curvature and astigmatism. If the upper limits of conditions (1) and (2) are exceeded, aberrational compensation results, but a compact lens system is not achieved.

Condition (3) should be met to compensate for chromatic aberration. If this condition is not satisfied, undesirable undercompensation for chromatic aberration results.

Conditions (4) and (5) should be satisfied to ensure that no variations in spherical aberration occur during focusing for a near distance object. Therefore, any spherical aberration that is undercompensated for in the first lens unit is compensated for by developing a corresponding amount of overcompensation for spherical aberration within the second lens unit which, like the first lens unit, will not move during focusing. If conditions (4) and (5) are satisfied, spherical aberrations can be properly compensated for without developing spherical aberration of higher orders by unduly increasing the cemented surface curvature.

If the upper limit of condition (4) is exceeded, the spherical aberration that occurs in the first lens unit will be excessively overcompensated for. If the upper limit of this condition (4) is exceeded, variations in spherical aberration will be compensated for insufficiently.

If condition (5) is not satisfied, spherical aberration of higher orders is more likely to occur. Simultaneously, field curvature will be excessively overcompensated for.

Condition (6) should be satisfied to compensate for field curvature. If this condition is not satisfied, field curvature will be excessively overcompensated for.

Conditions (7) and (20)–(22) are necessary to further decrease the telephoto ratio of a lens system that satisfies conditions (1)–(6).

Condition (7) defines the required power of the second lens unit. If the lower limit of this condition is not reached (i.e., if the second lens unit has a negative power), providing the space necessary for the movement of the third lens unit is difficult. If the second lens unit has a positive power that exceeds the upper limit of condition (7), reducing the telephoto ratio between the first and second lens units becomes impossible.

Condition (20) should be satisfied in order to reduce the telephoto ratio while achieving compensation for chromatic aberration. If the lower limit of this condition is not met, effective compensation for chromatic aberration can be achieved, but a compact lens system is difficult to achieve. If the upper limit of condition (20) is met or exceeded, lateral chromatic aberration is difficult to compensate for.

Condition (21) defines the required magnifying power of the focusing lens unit to achieve both a compact lens system, and a decrease in aberrational variations that would occur during focusing at near distance. If the upper limit of this condition is met or exceeded, the aberrational variations that occur during focusing at near distance are small, but when the lens system is focused at near distance (for an object at a finite distance) the focusing lens unit is moved immensely, thus increasing the overall system size. If the lower limit of condition (21) is reached, the focusing lens unit's movements during focusing at near distance is decreased. This aids in achieving a compact lens system; however, increased aberrational variations result during focusing at near distance.

Condition (22), like condition (4), should be satisfied in order to reduce variations in spherical aberration. If the lower limit of condition (22) is not reached, variations in spherical aberration will be undercompensated for, or the meridional image plane at middle view angle will become overcompensated. If the upper limit of condition (22) is met or exceeded, the space required for the focusing lens unit's movement cannot be ensured.

Conditions (23) and (24) define the achromatism of secondary spectra. If these conditions are met, longitudinal (axial) chromatic aberration, which is likely to occur on the shorter wavelength side when telephoto ratio is reduced, can be reduced sufficiently to produce an image without flare.

As defined in condition (21), the third lens unit is a negative lens unit having a magnifying power range of from 1/0.58x through 1/0.40x. If the third lens unit has such a high magnifying power range, and is composed of two lens elements which are positive and negative, or vice versa, from the object side, there is insufficient design freedom to achieve satisfactory compensation for chromatic aberration, spherical aberration, and astigmatism, and the Petzval sum will become negative, causing unduly large field curvature. To avoid these problems, the third lens unit used in the system of the present invention is composed of at least three lens elements.

Conditions (8)–(19) should be satisfied by the focusing third lens unit when it is composed of three lens elements as set forth under (A)–(D) described above to ensure that spherical aberration, longitudinal chromatic aberration, and lateral chromatic aberration effectively compensated for, and that the Petzval sum is not a large negative value.

Regarding the refractive indices of positive and negative lenses in the third lens unit, condition (6) must be satisfied to compensate for field curvature. With the lens type (A) shown above, the height of the marginal ray intercept on tee second negative lens (III-2) in the third lens unit is fairly small so that the power of this lens must be increased. Accordingly, the difference between the average refractive indices of the positive and negative lenses in the third lens unit must be greater than that indicated by condition (6). As a result, condition (8) is fulfilled and, thereby, the Petzval sum is not a large negative value.

The conditions for the distances between the lenses in the third lens unit set forth the lens arrangement, and are derived from the third lens unit which has a negative lens or a negative lens unit disposed on the object side to attain image magnification, and which has a positive lens or a positive lens unit disposed on the image plane side for correcting the image plane. Unless this lens arrangement is adopted, compensating for field curvature is difficult.

EXAMPLES

Five examples of the present invention are described below with reference to the accompanying data sheets, in which: $F_{NO}$ is an F number; f, a focal length; $\omega$, a half view angle; $f_B$, a back focus; r, the radius of individual lens surface curvature; d, the thickness of a lens, or the axial distance between lenses; N, the refractive index of an individual lens at the d-line; $\nu$, the Abbe number of an individual lens; and $\theta$, a partial dispersion ratio. In the data sheets, lens surfaces are numbered consecutively and are counted from the first surface of the lens I-1 in the first lens unit.

As a basis for comparison, the third-order aberration coefficients of the lens surfaces in Example 1 of each of the present invention, the invention described in JP-A-59-170811, and the invention described in Japanese Patent Application No. 62-26787 are shown in Tables 1, 2, and 3, respectively.

EXAMPLE 1

| $F_{NO}$ = 1:4.5 | f = 300.0 | Closest focusing distance | 2100 mm |
| $\omega$ = 4.1 | $f_B$ = 60.01 | Imaging magnification | −0.163x |

| Surface No. | r | d | N | $\nu$ | $\theta$ |
|---|---|---|---|---|---|
| 1 | 86.335 | 10.50 | 1.49700 | 81.6 | 0.538 |
| 2 | −3296.081 | 0.70 | | | |
| 3 | 63.593 | 8.20 | 1.49700 | 81.6 | 0.538 |
| 4 | 149.035 | 26.20 | | | |
| 5 | −3532.739 | 3.10 | 1.83400 | 37.2 | 0.5774 |
| 6 | 44.276 | 1.50 | | | |
| 7 | 36.532 | 8.40 | 1.49700 | 81.6 | 0.538 |
| 8 | 2666.570 | 27.10 | | | |
| 9 | 65.325 | 5.70 | 1.59270 | 35.3 | 0.5934 |
| 10 | −29.784 | 1.70 | 1.80400 | 46.6 | 0.5571 |
| 11 | 263.183 | 5.00~19.96 | | | |
| 12 | −154.129 | 2.30 | 1.59270 | 35.3 | |
| 13 | −67.081 | 1.00 | | | |
| 14 | −128.278 | 1.80 | 1.80400 | 46.6 | |
| 15 | 40.136 | 27.90 | | | |
| 16 | 58.678 | 3.90 | 1.69895 | 30.1 | |
| 17 | 169.667 | | | | |

EXAMPLE 2

| $F_{NO}$ = 1:5.6 | f = 400.0 | Closest focusing distance | 2800 mm |
| $\omega$ = 3.1 | $f_B$ = 78.23 | Imaging magnification | −0.159x |

| Surface No. | r | d | N | $\nu$ | $\theta$ |
|---|---|---|---|---|---|
| 1 | 97.419 | 10.60 | 1.49700 | 81.6 | 0.538 |
| 2 | ∞ | 0.80 | | | |
| 3 | 88.860 | 7.20 | 1.49700 | 81.6 | 0.538 |
| 4 | 192.038 | 35.10 | | | |
| 5 | −1334.632 | 3.50 | 1.80610 | 33.3 | 0.588 |
| 6 | 72.926 | 2.00 | | | |
| 7 | 61.327 | 5.60 | 1.49700 | 81.6 | 0.538 |
| 8 | 265.074 | 53.40 | | | |
| 9 | 72.591 | 4.20 | 1.59270 | 35.3 | 0.5934 |
| 10 | −45.428 | 2.10 | 1.80400 | 46.6 | 0.5571 |
| 11 | 193.949 | 4.70~31.53 | | | |
| 12 | −3804.516 | 2.80 | 1.59270 | 35.3 | |

-continued

| | | | | |
|---|---|---|---|---|
| 13 | −57.441 | 3.60 | | |
| 14 | −55.952 | 2.20 | 1.80400 | 46.6 |
| 15 | 68.333 | 28.28 | | |
| 16 | 81.332 | 3.20 | 1.64769 | 33.8 |
| 17 | 327.683 | | | |

EXAMPLE 3

| $F_{NO}$ = 1:5.6 | f = 400.0 | Closest focusing distance | 2800 mm |
|---|---|---|---|
| ω = 3.1 | $f_B$ = 77.90 | Imaging magnification | −0.160x |

| Surface No. | r | d | N | ν | θ |
|---|---|---|---|---|---|
| 1 | 121.703 | 9.10 | 1.49700 | 81.6 | 0.538 |
| 2 | −2998.286 | 0.80 | | | |
| 3 | 86.077 | 8.00 | 1.49700 | 81.6 | 0.538 |
| 4 | 293.360 | 30.50 | | | |
| 5 | 37582.545 | 3.50 | 1.83400 | 37.2 | 0.5774 |
| 6 | 65.513 | 2.00 | | | |
| 7 | 50.961 | 7.10 | 1.49700 | 81.6 | 0.538 |
| 8 | 281.514 | 53.40 | | | |
| 9 | 84.832 | 4.50 | 1.59270 | 35.3 | 0.5934 |
| 10 | −38.095 | 2.00 | 1.80400 | 46.6 | 0.5571 |
| 11 | 234.810 | 6.00~30.97 | | | |
| 12 | 141.258 | 2.20 | 1.80400 | 46.6 | |
| 13 | 35.222 | 1.00 | | | |
| 14 | 34.042 | 2.30 | 1.80518 | 25.4 | |
| 15 | 43.758 | 35.00 | | | |
| 16 | 55.970 | 2.70 | 1.64769 | 33.8 | |
| 17 | 77.889 | | | | |

EXAMPLE 4

| $F_{NO}$ = 1:5.6 | f = 400.0 | Closest focusing distance | 2400 mm |
|---|---|---|---|
| ω = 3.1 | $f_B$ = 97.20 | Imaging magnification | −0.189x |

| Surface No. | r | d | N | ν | θ |
|---|---|---|---|---|---|
| 1 | 121.690 | 9.30 | 1.49700 | 81.6 | 0.538 |
| 2 | −2085.256 | 1.00 | | | |
| 3 | 83.842 | 7.90 | 1.49700 | 81.6 | 0.538 |
| 4 | 232.703 | 32.90 | | | |
| 5 | ∞ | 3.50 | 1.83400 | 37.2 | 0.5774 |
| 6 | 62.772 | 2.00 | | | |
| 7 | 48.824 | 7.30 | 1.49700 | 81.6 | 0.538 |
| 8 | 394.389 | 47.70 | | | |
| 9 | 99.532 | 5.00 | 1.59270 | 35.3 | 0.5934 |
| 10 | −36.257 | 2.00 | 1.80400 | 46.6 | 0.5571 |
| 11 | 355.566 | 9.40~40.38 | | | |
| 12 | 77.984 | 2.20 | 1.77250 | 49.6 | |

-continued

| | | | | |
|---|---|---|---|---|
| 13 | 35.775 | 9.40 | | |
| 14 | −164.162 | 2.30 | 1.77250 | 49.6 |
| 15 | 183.368 | 5.00 | | |
| 16 | 63.526 | 3.90 | 1.64769 | 33.8 |
| 17 | −475.790 | | | |

EXAMPLE 5

| $F_{NO}$ = 1:5.6 | f = 400.0 | Closest focusing distance | 280 mm |
|---|---|---|---|
| ω = 3.1 | $f_B$ = 78.50 | Imaging magnification | −0.156x |

| Surface No. | r | d | N | ν | θ |
|---|---|---|---|---|---|
| 1 | 113.630 | 9.60 | 1.49700 | 81.6 | 0.538 |
| 2 | −2093.970 | 0.80 | | | |
| 3 | 84.269 | 7.50 | 1.49700 | 81.6 | 0.538 |
| 4 | 210.158 | 35.90 | | | |
| 5 | −2640.102 | 3.50 | 1.83400 | 37.2 | 0.5774 |
| 6 | 59.019 | 1.80 | | | |
| 7 | 47.386 | 7.10 | 1.49700 | 81.6 | 0.538 |
| 8 | 408.156 | 45.90 | | | |
| 9 | 105.049 | 4.60 | 1.59270 | 35.3 | 0.5934 |
| 10 | −36.694 | 2.00 | 1.80400 | 46.6 | 0.5571 |
| 11 | 967.720 | 4.50~30.87 | | | |
| 12 | 181.217 | 2.00 | 1.77250 | 49.6 | |
| 13 | 49.519 | 32.00 | | | |
| 14 | 65.512 | 5.20 | 1.64769 | 33.8 | |
| 15 | −133.424 | 6.90 | | | |
| 16 | −165.639 | 2.20 | 1.80610 | 40.9 | |
| 17 | 96.913 | | | | |

The telephoto lenses constructed in Examples 1–5 satisfy conditions (1)–(22) as follows:

| Condition | Example 1 | Example 2 | Example 3 | Example 4 | Example 5 |
|---|---|---|---|---|---|
| $f_{I-1,2}/f$ | 0.320 | 0.308 | 0.301 | 0.308 | 0.307 |
| $f_I/f$ | 0.469 | 0.518 | 0.473 | 0.465 | 0.497 |
| $ν_{IP} - ν_{IN}$ | 44.4 | 48.3 | 44.4 | 44.4 | 44.4 |
| $\dfrac{f(n_{II-2} - n_{II-1})}{r_{II-2}}$ | −2.13 | −1.86 | −2.22 | −2.33 | −2.30 |
| $n_{II-2} - n_{II-1}$ | 0.211 | 0.211 | 0.211 | 0.211 | 0.211 |
| $n_{III\,N} - n_{III\,P}$ | 0.158 | 0.184 | 0.0776 | 0.125 | 0.142 |
| $f/f_{II}$ | −0.222 | −0.170 | −0.720 | −0.792 | −0.336 |
| $d_{III-1,2}/f$ | 0.0033 | 0.0090 | 0.0025 | 0.0235 | 0.0800 |
| $d_{III-2,3}/f$ | 0.0930 | 0.0707 | 0.0875 | 0.0125 | 0.0173 |
| $d_{I-2,3}/f$ | 0.0873 | 0.0878 | 0.0763 | 0.0823 | 0.0898 |
| $f_{III}/f$ | 0.469 | 0.518 | 0.518 | 0.517 | 0.517 |
| L/f | 0.319 | 0.359 | 0.325 | 0.315 | 0.333 |
| Telephoto ratio | 0.650 | 0.619 | 0.620 | 0.620 | 0.625 |

TABLE 1

| Surface No. | S1 | S2 | S3 | P | S5 | L | T |
|---|---|---|---|---|---|---|---|
| 1 | 9.306 | −3.837 | 1.582 | 1.153 | −1.128 | 0.0174 | −0.0072 |
| 2 | 3.311 | −4.095 | 5.064 | 0.030 | −6.301 | 0.0089 | −0.0110 |
| 3 | 0.137 | −0.040 | 0.011 | 1.566 | −0.459 | 0.0131 | −0.0038 |
| 4 | 2.158 | −3.216 | 4.791 | −0.668 | −6.143 | 0.0060 | −0.0089 |
| 5 | −13.616 | 13.690 | −13.764 | −0.038 | 13.877 | −0.0304 | 0.0305 |
| 6 | −12.676 | 0.982 | −0.076 | −3.081 | 0.244 | −0.0396 | 0.0031 |
| 7 | 19.081 | −2.488 | 0.324 | 2.726 | −0.397 | 0.0152 | −0.0020 |
| 8 | 2.756 | −3.520 | 4.495 | −0.037 | −5.693 | 0.0057 | −0.0073 |
| 9 | −0.074 | 0.427 | −2.466 | 1.709 | 4.373 | −0.0024 | 0.0136 |
| 10 | −10.700 | 2.342 | −0.512 | −0.740 | 0.274 | 0.0045 | −0.0010 |
| 11 | 1.380 | −2.210 | 3.539 | −0.508 | −4.854 | 0.0067 | −0.0108 |
| 12 | −2.852 | 2.737 | −2.628 | −0.724 | 3.218 | −0.0103 | 0.0099 |
| 13 | 6.896 | −3.779 | 2.071 | 1.664 | −2.047 | 0.0139 | −0.0076 |
| 14 | −4.946 | 3.592 | −2.610 | −1.042 | 2.653 | −0.0099 | 0.0072 |
| 15 | −0.065 | −0.214 | −0.708 | −3.331 | −13.318 | −0.0044 | −0.0143 |
| 16 | −0.004 | −0.048 | −0.511 | 2.103 | 16.864 | 0.0021 | 0.0228 |
| 17 | 0.047 | −0.250 | 1.325 | −0.727 | −3.159 | 0.0023 | −0.0122 |

TABLE 1-continued

| Surface No. | S1 | S2 | S3 | P | S5 | L | T |
|---|---|---|---|---|---|---|---|
| SUM | 0.141 | 0.070 | −0.070 | 0.053 | −1.999 | −0.0009 | 0.0008 |

TABLE 2

| Surface No. | S1 | S2 | S3 | P | S5 | L | T |
|---|---|---|---|---|---|---|---|
| 1 | 4.669 | −0.814 | 0.142 | 0.906 | −0.183 | 0.0158 | −0.0028 |
| 2 | 1.088 | −1.451 | 1.935 | −0.021 | −2.552 | 0.0070 | −0.0093 |
| 3 | 0.466 | −0.032 | 0.002 | 1.131 | −0.078 | 0.0088 | −0.0006 |
| 4 | 17.967 | −14.461 | 11.639 | 0.137 | −9.478 | 0.0122 | −0.0098 |
| 5 | −27.429 | 20.619 | −15.500 | −0.517 | 12.041 | −0.0411 | 0.0309 |
| 6 | −3.727 | −0.319 | −0.027 | −1.727 | −0.150 | −0.0284 | −0.0024 |
| 7 | 8.735 | −0.370 | 0.015 | 1.784 | −0.076 | 0.0182 | −0.0008 |
| 8 | 2.320 | −2.725 | 3.201 | −0.095 | −3.648 | 0.0080 | −0.0094 |
| 9 | 0.950 | 0.247 | 0.064 | 3.600 | 0.955 | 0.0159 | 0.0041 |
| 10 | −4.663 | −1.084 | −0.252 | −4.271 | −1.051 | −0.0180 | −0.0042 |
| 11 | −0.030 | −0.191 | −1.205 | 1.678 | 2.977 | 0.0022 | 0.0138 |
| 12 | 1.781 | −2.224 | 2.778 | −0.585 | −2.738 | 0.0104 | −0.0130 |
| 13 | −1.943 | 2.455 | −3.101 | 0.712 | 3.018 | −0.0080 | 0.0101 |
| 14 | 0.106 | 0.213 | 0.428 | −2.637 | −4.435 | −0.0058 | −0.0117 |
| 15 | −1.354 | 0.226 | −0.038 | −2.267 | 0.385 | −0.0087 | 0.0015 |
| 16 | −0.000 | −0.001 | −0.023 | −0.030 | −0.805 | 0.0003 | 0.0043 |
| 17 | 1.217 | −0.000 | 0.000 | 2.243 | −0.000 | 0.0107 | 0.0000 |
| SUM | 0.154 | 0.085 | 0.058 | 0.043 | −5.821 | −0.0007 | 0.0007 |

TABLE 3

| Surface No. | S1 | S2 | S3 | P | S5 | L | T |
|---|---|---|---|---|---|---|---|
| 1 | 29.013 | −14.772 | 7.521 | 1.685 | −4.687 | 0.0254 | −0.0130 |
| 2 | 2.286 | −3.163 | 4.377 | −0.239 | −5.727 | 0.0071 | −0.0098 |
| 3 | −0.924 | 0.025 | −0.000 | 1.394 | −0.038 | 0.0078 | −0.0002 |
| 4 | 3.339 | −4.562 | 6.233 | −0.645 | −7.636 | 0.0070 | −0.0096 |
| 5 | −23.991 | 21.829 | −19.862 | −0.588 | 18.608 | −0.0371 | 0.0338 |
| 6 | −30.994 | 4.581 | −0.677 | −3.543 | 0.623 | −0.0488 | 0.0072 |
| 7 | 35.417 | −6.198 | 1.084 | 2.927 | −0.702 | 0.0173 | −0.0030 |
| 8 | 3.619 | −4.164 | 4.791 | 0.403 | −5.977 | 0.0065 | −0.0075 |
| 9 | −0.316 | −0.432 | −0.591 | 2.682 | 2.859 | 0.0087 | 0.0119 |
| 10 | −16.560 | 5.889 | −2.094 | −0.562 | 0.945 | 0.0038 | −0.0014 |
| 11 | 0.823 | −1.783 | 3.862 | −1.247 | −5.664 | 0.0060 | −0.0129 |
| 12 | −3.418 | 3.938 | −4.538 | −0.192 | 5.450 | −0.0130 | 0.0149 |
| 13 | 1.931 | −0.532 | 0.147 | 0.177 | −0.089 | 0.0114 | −0.0031 |
| 14 | −0.113 | −0.242 | −0.521 | −3.257 | −8.113 | −0.0056 | −0.0120 |
| 15 | −0.004 | −0.063 | −0.889 | 1.662 | 10.925 | 0.0009 | 0.0124 |
| 16 | 0.044 | −0.221 | 1.107 | −0.614 | −2.465 | 0.0014 | −0.0070 |
| SUM | 0.150 | 0.128 | −0.048 | 0.043 | −1.690 | −0.0011 | 0.0007 |

As described on the foregoing pages, the present invention provides an improved telephoto lens system having: a very compact system with a telephoto ratio of no more than 0.7, and yet, still compensating effectively for aberrations when focused for an object at infinity; an inner focusing method, yet capable of focusing effectively at the closest distance which is no greater than 7 times the focal length for infinity; and performance resistant to variation even if the machining precision during lens manufacturing is nonuniform.

While certain preferred embodiments have been shown and described, many changes and modifications within the spirit of the invention will be apparent to those of working skill in this technical field. Thus, the scope of the invention should be considered as limited only by the appended claims.

We is claimed is:

1. A telephoto lens system comprising, in order from the object side:

a first lens unit having a positive refractive power, said first lens unit comprising a positive first lens (I-1), a positive second lens (I-2), a negative third lens (I-3), and a positive fourth lens (I-4);

a second lens unit having a weak refractive power, said second lens unit comprising a cemented lens having a positive first lens (II-1) cemented to a negative second lens (II-2); and a third lens unit having a negative refractive power and which performs focusing for an object at a finite distance by movement of said third lens unit, said third lens unit comprising at least one negative lens element and at least one positive lens element; wherein said system satisfies the following conditions (1)–(7):

$$0.26 < f_{I\text{-}1,2}/f < 0.34 \tag{1}$$

$$0.40 < f_1/f < 0.58 \tag{2}$$

$$35 < \nu_{IP} - \nu_{IN} \tag{3}$$

$$-2.8 < \frac{f(n_{II\text{-}2} - n_{II\text{-}1})}{r_{II\text{-}2}} < -1.6 \tag{4}$$

$$0.16 < n_{II\text{-}2} - n_{II\text{-}1} \tag{5}$$

$$0.075 < n_{III\,N} - n_{III\,P} \quad (6)$$

$$-1.00 < f/f_{II} < 0.04 \quad (7)$$

where f: overall focal length of the telephoto lens system
$f_{I-1,2}$: composite focal length from said lens I-1 to said lens I-2
$f_I$: composite focal length of said first lens unit
$\nu_{IP}$: an average of Abbe numbers of positive lenses in said first lens unit
$\nu_{IN}$: an average of Abbe numbers of negative lenses in said first lens unit
$r_{II-2}$: radius of curvature of a cemented surface of said second lens unit
$n_{i-j}$: refractive index at a d-line of a j-th lens in an i-th lens unit as counted from said object side
$n_{III\,N}$: an average of refractive indices at said d-line of negative lenses in said third lens unit
$n_{III\,P}$: an average of refractive indices at said d-line of positive lenses in said third lens unit
$f_{II}$: a composite focal length of said second lens unit.

2. A telephoto lens system according to claim 1, wherein said third lens unit comprises:
a positive first lens (III-1) having a strong convex surface on an image side;
a negative second lens (III-2); and
a positive meniscus third lens (III-3) having a convex surface directed toward said object;
wherein three conditions, (8)–(10), additionally are satisfied:

$$0.090 < n_{III\,N} - n_{III\,P} \quad (8)$$

$$0.0 < d_{III-1,2}/f < 0.02 \quad (9)$$

$$0.04 < d_{III-2,3}/f < 0.11 \quad (10)$$

where $d_{III-1,2}$: a distance between said positive first lens III-1 and said negative second lens III-2
$d_{III-2,3}$: a distance between said negative second lens III-2 and said positive meniscus third lens III-3.

3. A telephoto lens system according to claim 2 which additionally satisfies conditions (20)–(22):

$$0.07 < d_{I-2,3}/f < 0.10 \quad (20)$$

$$0.40 < f_{I,II}/f < 0.58 \quad (21)$$

$$0.26 < L/f < 0.40 \quad (22)$$

where $d_{I-2,3}$: a distance between said positive second lens (I-2) and said negative third lens (I-3) in said first lens unit
$f_{I,II}$: a composite focal length from said first lens unit to said second lens unit
L: a distance from a second principal point of said first lens unit to a cemented surface of said second lens unit.

4. A telephoto lens system according to claim 1, wherein said third lens unit comprises:
a negative meniscus first lens (III-1);
a positive meniscus second lens (III-2); and
a positive meniscus third lens (III-3);
each of said first through third lenses having a convex surface directed toward said object, with three conditions, (11)–(13), additionally being satisfied:

$$0.075 < n_{III\,N} - n_{III\,P} \quad (11)$$

$$0.0 < d_{III\,1,2}/f < 0.02 \quad (12)$$

$$0.04 < d_{III\,2,3}/f < 0.11 \quad (13).$$

5. A telephoto lens system according to claim 4 which additionally satisfies conditions (20)–(22):

$$0.07 < d_{I-2,3}/f < 0.10 \quad (20)$$

$$0.40 < f_{I,II}/f < 0.58 \quad (21)$$

$$0.26 < L/f < 0.40 \quad (22)$$

where $d_{I-2,3}$: a distance between said positive second lens (I-2) and said negative third lens (I-3) in said first lens unit
$f_{I,II}$: a composite focal length from said first lens unit to said second lens unit
L: distance from a second principal point of said first lens unit to a cemented surface of said second lens unit.

6. A telephoto lens system according to claim 1, wherein said third lens unit comprises:
a negative meniscus first lens (III-1) having a convex surface directed toward said object;
a negative second lens (III-2); and
a positive third lens (III-3);
wherein three conditions, (14)–(16), additionally are satisfied:

$$0.075 < n_{III\,N} - n_{III\,P} \quad (14)$$

$$0.02 < d_{III-1,2}/f < 0.08 \quad (15)$$

$$0.00 < d_{III-2,3}/f < 0.04 \quad (16).$$

7. A telephoto lens system according to claim 6 which additionally satisfies conditions (20)–(22):

$$0.07 < d_{I-2,3}/f < 0.10 \quad (20)$$

$$0.40 < f_{I,II}/f < 0.58 \quad (21)$$

$$0.26 < L/f < 0.40 \quad (22)$$

where $d_{I-2,3}$: a distance between said positive second lens (I-2) and said negative third lens (I-3) in said first lens unit
$f_{I,II}$: a composite focal length from said first lens unit to said second lens unit
L: a distance from a second principal point of said first lens unit to a cemented surface of said second lens unit.

8. A telephoto lens system according to claim 1, wherein said third lens unit comprises:
a negative meniscus first lens (III-1) having a convex surface directed toward said object;
a positive second lens (III-2); and
a negative third lens (III-3);
wherein three conditions, (17)–(19), additionally are satisfied:

$$0.075 < n_{III\,N} - n_{III\,P} \quad (17)$$

$$0.02 < d_{III-1,2}/f < 0.11 \quad (18)$$

$$0.00 < d_{III-2,3}/f < 0.04 \quad (19).$$

9. A telephoto lens system according to claim 8 which additionally satisfies conditions (20)–(22):

$$0.07 < d_{I\text{-}2,3}/f < 0.10 \tag{20}$$

$$0.40 < f_{I,II}/f < 0.58 \tag{21}$$

$$0.26 < L/f < 0.40 \tag{22}$$

where $d_{I\text{-}2,3}$: a distance between said positive second lens (I-2) and said negative third lens (I-3) in said first lens unit $f_{I,II}$: a composite focal length from said first lens unit to said second lens unit L: a distance from a second principal point of said first lens unit to a cemented surface of said second lens unit.

10. A telephoto lens system according to claim 1 which additionally satisfies conditions (20)-(22):

$$0.7 < d_{I\text{-}2,3}/f < 0.10 \tag{20}$$

$$0.40 < f_{I,II}/f < 0.58 \tag{21}$$

$$0.26 < L/f < 0.40 \tag{22}$$

where $d_{I\text{-}2,3}$: a distance between said positive second lens (I-2) and said negative third lens (I-3) in said first lens unit $f_{I,II}$: a composite focal length from said first lens unit to said second lens unit L: a distance from a second principal point of said first lens unit to a cemented surface of said second lens unit.

11. A telephoto lens system according to any one of preceding claims, wherein each said positive lens in said first lens unit and said second lens unit satisfies a following condition (23), and each said negative lens in said first lens unit and said second lens unit satisfy a following condition (24):

$$\theta_{ij} > -0.0018\theta_{ij} + 0.653 \tag{23}$$

$$\theta_{ij} < -0.0018\theta_{ij} + 0.649 \tag{24}$$

where $\theta$hd ij: a partial dispersion ratio of a j-th lens in the i-th lens unit as counted from said object side $$\left( \theta = \frac{n_g - n_F}{n_F - n_c} \right)$$

$\theta_{ij}$: an Abbe number of a j-th lens in an i-th lens unit as counted from said object side.

* * * * *